Dec. 27, 1949 E. GUETZKOW 2,492,797
MILLING CUTTER
Filed Jan. 10, 1947
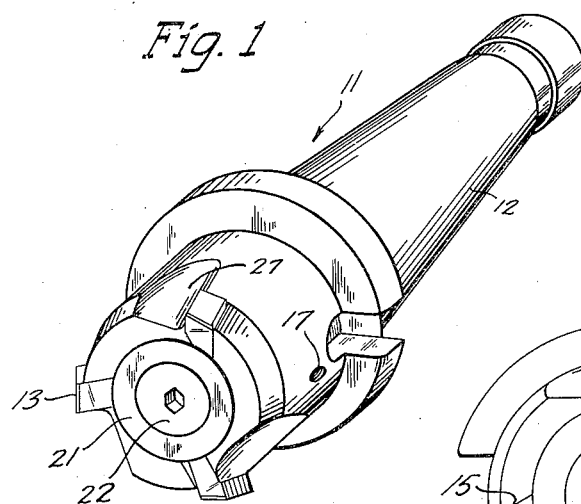
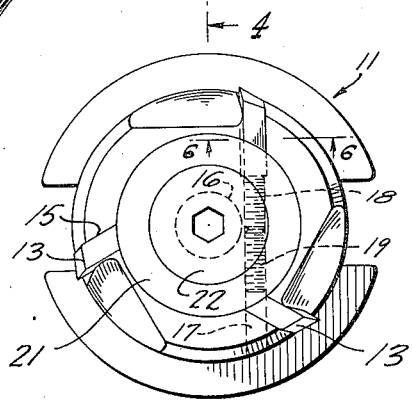
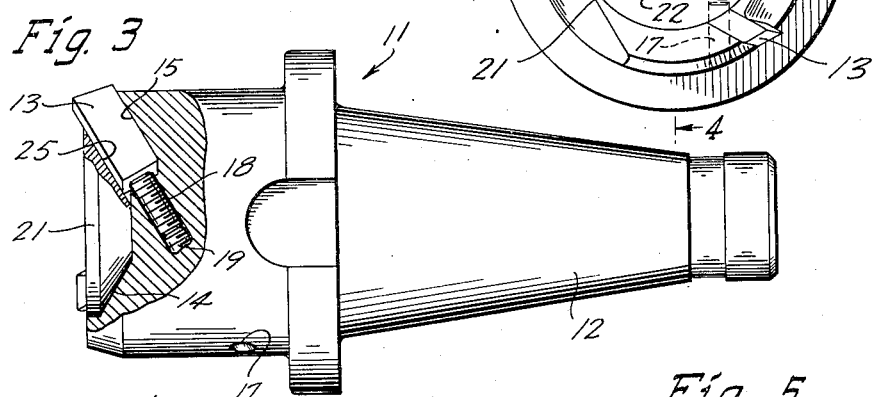
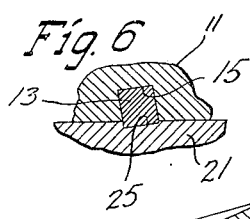
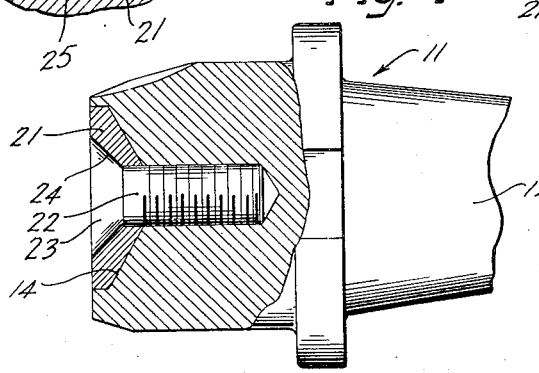
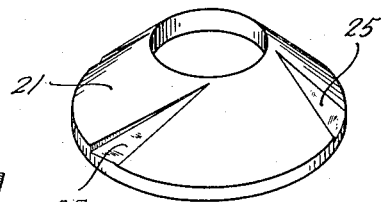
INVENTOR.
Edward Guetzkow
BY W. D. O'Connor
Attorney Patented Dec. 27, 1949

2,492,797

UNITED STATES PATENT OFFICE 2,492,797

MILLING CUTTER

Edward Guetzkow, West Allis, Wis., assignor to Kearney & Trecker Corporation, West Allis, Wis., a corporation of Wisconsin Application January 10, 1947, Serial No. 721,215

4 Claims. (Cl. 29—105)

This invention relates, generally, to rotary cutting tools and more particularly to an improved milling cutter of the inserted blade type.

A general object of the invention is to provide a simple and rugged inserted blade milling cutter.

Another object of the invention is to provide an improved arrangement for retaining cutting blades in an inserted blade milling cutter.

Still another object is to provide an improved milling cutter in which cutting blades are inserted in slots in a conical recess and clamped by a complementary conical clamping member.

According to this invention, an inserted blade face milling cutter is constituted by a cylindrical cutter body presenting at its cutting end a conical depression. A plurality of cutting blades, preferably three, are fitted in equally spaced slots formed in the surface of the conical depression in manner to project radially and axially from the end of the cutter body at the desired cutting angles. The three blades are retained in their slots with equalized clamping pressures by means of a conical blade holding washer held in position by a central, axially disposed cap screw threaded into the cutter body. The blade receiving slots are disposed tangentially of the screw receiving part of the body and merge into threaded openings extending inwardly through the cutter body. Suitable adjusting screws are threaded in these openings in manner to bear against the inner ends of the blades for positioning them radially.

The foregoing and other objects of this invention, which will become more fully apparent, may be achieved by means of the specific cutter herein set forth by way of example in connection with the accompanying drawing in which:

Figure 1 is a general view in perspective of a face or end milling cutter embodying the invention;

Fig. 2 is a view in end elevation of the cutter illustrated in Fig. 1, showing the cutting end thereof;

Fig. 3 is a view in side elevation of the cutter with part of the cutting end broken away to show the blade adjusting and retaining arrangement;

Fig. 4 is a view generally similar to Fig. 3 with parts broken away to show the cutting end of the cutter in medial section along the plane represented by the line 4—4 in Fig. 2;

Fig. 5 is a view in perspective of the blade retaining washer; and

Fig. 6 is a detailed view in section, taken transversely of a cutting blade on the plane represented by the line 6—6 in Fig. 2.

The particular milling cutter shown in the drawing, is of the face milling or end milling type, although it is to be understood that the invention herein set forth may be utilized advantageously in connection with various other cutters of quite different construction.

Referring more specifically to the drawing, the illustrated rotary inserted blade cutter embodying the invention comprises a solid cutter body 11 of generally cylindrical shape adapted for rotation about its longitudinal axis. As best shown in Figs. 1 and 3, the cutter body 11 is provided at one end with an elongated shank 12 adapted to be received in the socket of a driving spindle and carries at its opposite or cutting end, three radially disposed angularly spaced cutting teeth or blades 13. As best shown in Fig. 6, the blades 13 are formed from stock that is square in cross-section, although blades of other shapes may be used. The cutter body 11 may be of any diameter and length to suit the particular work at hand and the shank 12 may be of any shape and size to engage a complementary cooperating driving connection or socket, the particular shape shown being that adapted to engage the standard socket of a milling machine spindle nose. However, it is to be understood that the particular cutter shown or variations of it may be utilized in various other machine tools such as, boring machines, drill presses, or the like, as well as in a milling machine.

At its cutting end, the cutter body 11 is provided with a concentric conical recess or depression 14 in the surface of which three rectangular blade receiving grooves or slots 15 are formed in symmetrical equally spaced angular relationship for holding the blades 13 with their ends projecting radially and axially outward from the end of the cutter body at an inclination of approximately 30° to a transverse plane. As best shown in Fig. 2, the three equally spaced slots 15 are arranged tangent to an imaginary cylinder indicated by the dotted circle 16 concentric with the axis of the cutter body, each slot being inclined about 15° to an axial plane through its outer end. Each slot terminates at its outer end in the periphery of the cutter body at the rim of the conical recess 14 and merges at its inner end into a threaded bore or hole 17 that extends inwardly through the body. Each blade 13 is positioned in and may be adjusted along its cooperating slot 15 by an adjusting or backing screw 18 threaded in the bore 17 and locked in position by a longer locking or jamming screw 19 threaded in the bore 17 behind it. The adjusting and locking screws may be hollow set screws or the equivalent, adapted to be turned by a tool inserted through the bore 17. By this arrangement, the rectangular blades 13 are solidly backed and rigidly supported by the sides and bottoms of the complementary slots 15 and the backing screws 18 in manner to resist the cutting forces exerted upon their cutting ends when the cutter is in operation.

In accordance with this invention, the three cutting blades 13 are retained in adjusted positions in their respective slots 15 by a single clamping member or blade holding washer 21 of conical shape complementary with and adapted to fit within the conical depression 14 in the end of the cutter body 11. As best shown in Fig. 4, the conical blade retaining washer 21 is secured in position by means of a single central clamping screw 22 threaded axially into the end of the cutter body 11 and provided with a conical head 23 seating in a conical socket 24 in the outer surface of the washer 21, the arrangement being such that when the clamping screw 22 is tightened, the washer 21 engages the three blades 13 with equalized clamping pressures.

As best shown in Figs. 3 and 4, the conical washer 21 and the conical bolt head 23 are disposed with their outer surfaces substantially flush with the end face of the cutter body 11.

As shown in the detailed sectional view Fig. 6, the blades 13 and their receiving slots 15 are tilted or canted in the cutter body, in this instance, to the extent of about 7° from an axial plane. For properly engaging the projecting surface of the canted blades 13, the retaining washer 21 is provided on its clamping surface with angularly disposed grooves or recesses 25 shaped complementary to the projecting blade surfaces. Sufficient clearance is provided between the complementary surface of the conical washer 21 and the surface of the conical depression 14 to insure that the blades 13 will be clamped securely between the surfaces of the grooves 25 in the washer and the bottoms of the slots 15 in the cutter body with equalized clamping pressures when the single clamping screw 22 is tightened.

The blades or teeth 13 may be of any suitable cutting material, such as tungsten carbide, stellite or high speed steel, and the slots 15 are preferably shaped to receive stock sizes of the cutter blade material used, although they may be adapted to receive shanks or bits to which tips of cutting material are secured by brazing or the like in well known manner.

By means of the arrangement of adjusting screws, the blades 13 may be adjusted radially in the cutter body 11 to establish a predetermined effective diameter or cylinder of revolution of the cutter and this predetermined diameter may be maintained, in spite of wearing away of the blades, through successive periodic adjustments effected preferably at the time the blades are resharpened. To this end, the blades may be removed from the cutter, resharpened individually and then repositioned in the cutter to establish the desired cutting diameter, or, alternatively, the blades may be adjusted outwardly in their slots slightly beyond the desired diameter and then ground down in position to the diameter required, without removing them. When thus adjusted to the desired diameter, the cutter may be utilized in boring operations to finish a hole of corresponding diameter, or to face mill a slot of equivalent width.

As best shown in Fig. 1, the cutter body 11 is shaped at its cutting end to provide a chip clearance space or recess 27 in front of each blade 13 to permit chips formed during a cutting operation to escape from the forward face of the blade. The surface of each clearance space 27 is preferably hardened or chromium plated to better withstand the abrasive action of the chips.

The particular cutter structure shown in the drawing and herein described, is preferably utilized with cutting blades, constituted by square bars of tungsten carbide of stock size and is especially adapted for cutting steel in what is known as the carbide steel milling process. This cutter has been found to function with a high degree of efficiency in this work, a relatively small cutter being capable of removing hard material at a rapid rate without heating. For example, a cutter of 2 inches in diameter, while operating at about 650 revolutions per minute, will machine heat treated steel, cutting to a depth of ¼ inch, at a linear rate of feed of thirty inches per minute.

Although a particular cutter has been shown and described as exemplary of a practical embodiment of the invention, it will be apparent to those skilled in the art, that various modifications of the structure shown may be utilized, without departing from the spirit and scope of the invention as defined in the subjoined claims.

The principles of the invention having now been fully explained in connection with the foregoing description of an illustrative preferred embodying structure, I hereby claim as my invention or discovery:

1. In a milling cutter of the inserted blade type, a cutter body adapted to be rotatably mounted and presenting at its cutting end a concentric conical recess merging into an axially disposed threaded bore and three symmetrically disposed blade receiving slots extending axially and radially outward along the surface of said conical recess in generally tangential relationship with said bore, each of said slots merging at its inner end into an aligned threaded hole extending therefrom into and through said body, a cutting blade disposed in each of said slots respectively, an adjusting screw threaded in each of said holes in manner to abut the inner end of the blade in the associated slot for adjusting it outwardly to regulate the extent of its projection from said cutter body, a locking screw threaded in each of said holes in abutting relationship with said adjusting screw for locking it in adjusted position, a conical retaining member disposed in said conical recess and presenting on its surface radial grooves arranged to engage said three cutting blades, and a clamping bolt passing axially through said conical retaining member and threaded into said axial bore of said body in manner to clamp said blades with equalized pressure between said cutter body and said conical retaining member, whereby said blades are supported rigidly in adjusted position in said cutter body.

2. An end milling cutter of the inserted blade type, comprising a conical clamping washer presenting three equally spaced generally radially disposed grooves in its conical surface, three cutting blades disposed to engage said grooves in manner to lie tangent to the outer surface of said washer with their ends projecting in equally spaced relationship beyond the edge of said washer, a cutter body disposed with its axis of rotation concentric with said conical washer and presenting blade receiving slots complementary to said cutting blades, and means securing said washer to said cutter body with said blades received in said slots and clamped therebetween with equalized clamping pressures.

3. In a rotary milling cutter of the inserted blade type, a cutter body of generally cylindrical shape adapted for rotation about its axis and presenting at its cutting end a concentric conical recess merging into an axially disposed threaded bore, said conical recess presenting in its surface three symmetrically disposed rectangular blade receiving slots extending generally axially and radially in tangential relationship with a circle circumjacent to said axial bore, each of said slots being canted relative to the surface of said conical recess, a cutting blade of rectangular shape complementary to and embedded in each of said slots with its cutting end projecting axially and radially from said body in canted position, a conical retaining washer complementary to said conical recess and presenting three generally radially disposed canted grooves in its surface complementary to and arranged to engage the exposed surfaces of said blades in said slots, and an axially disposed clamping screw extending through said retaining washer and threaded into said axial bore, said screw being operative when tightened to clamp said washer against said blades with equalized pressure, whereby said blades are completely encompassed by the sides of said slots in said body and said grooves in said washer in such manner that they are supported rigidly in canted operating position in said cutter body.

4. In a rotary milling cutter of the inserted blade type, a cutter body of generally cylindrical shape adapted for rotation about its axis and presenting at its cutting end a concentric conical recess merging into an axially disposed threaded bore, said conical recess presenting three symmetrically disposed rectangular blade receiving slots extending along its surface axially and radially in generally tangential relationship with said axial bore, each of said slots being canted relative to the surface of said conical recess and each slot merging at its inner end into a threaded hole extending as a continuation thereof into and through said body, a cutting blade of rectangular shape complementary to and embedded in each of said slots with its cutting end projecting axially and radially from said body in canted position at the rim of said conical recess, an adjusting screw threaded in each of said threaded holes in manner to abut the inner end of each blade for adjusting its position in the associated slot to regulate the extent of its projection from said cutter body, a locking screw threaded in each of said holes in abutting relationship with the associated adjusting screw for locking it in adjusted position, a conical retaining washer complementary to said conical recess and presenting three radial canted grooves in its surface complementary to and disposed to engage the exposed surfaces of said blades in said slots, and an axially disposed clamping screw extending through said retaining washer and threaded into said axial bore, said screw being operative when tightened to clamp said washer against said blades with equalized pressure, whereby said blades are completely encompassed by the sides of said slots in said body and said grooves in said washer in manner to retain and support them rigidly in canted operating position in said cutter body.

EDWARD GUETZKOW.

REFERENCES CITED

The following references are of record in the file of this patent:

UNITED STATES PATENTS

| Number | Name | Date |
| --- | --- | --- |
| 1,045,000 | Dawson | Nov. 19, 1912 |
| 1,106,561 | Heinkel | Aug. 11, 1914 |
| 1,202,139 | Witanowski | Oct. 24, 1916 |
| 1,382,717 | Farnum | July 5, 1921 |
| 1,407,560 | Maxwell | Feb. 21, 1922 |
| 1,468,774 | Caldwell | Sept. 25, 1923 |